(12) United States Patent
Higashigawa et al.

(10) Patent No.: US 8,165,648 B2
(45) Date of Patent: Apr. 24, 2012

(54) ELECTRONIC APPARATUS

(75) Inventors: Hisashi Higashigawa, Higashiyamato (JP); Akira Watanabe, Fuchu (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 311 days.

(21) Appl. No.: 12/697,486

(22) Filed: Feb. 1, 2010

(65) Prior Publication Data
US 2010/0248796 A1  Sep. 30, 2010

(30) Foreign Application Priority Data
Mar. 31, 2009  (JP) ................... P2009-087998

(51) Int. Cl.
*H04M 1/00* (2006.01)
(52) U.S. Cl. ........... 455/575.3; 455/575.1; 455/575.4; 455/575.7; 455/550.1; 16/367; 16/334
(58) Field of Classification Search ........... 455/575.3, 455/566, 550.1, 575.1, 575.4, 575.7; 16/367, 16/334
See application file for complete search history.

(56) References Cited

U.S. PATENT DOCUMENTS

| | | | | |
|---|---|---|---|---|
| 8,005,516 | B2 * | 8/2011 | Ohki et al. ............. | 455/575.1 |
| 2004/0204202 | A1 * | 10/2004 | Shimamura et al. ..... | 455/575.1 |
| 2004/0219957 | A1 * | 11/2004 | Nishijima et al. ....... | 455/575.3 |
| 2005/0049017 | A1 * | 3/2005 | Yoda ...................... | 455/575.1 |
| 2008/0036452 | A1 * | 2/2008 | Hirayama .............. | 324/207.2 |
| 2009/0093283 | A1 * | 4/2009 | Mizuta et al. .......... | 455/575.3 |
| 2010/0207621 | A1 * | 8/2010 | Yano ...................... | 324/247 |

FOREIGN PATENT DOCUMENTS

JP 2008-067335 A 3/2008
JP 2008-278226 A 11/2008

* cited by examiner

*Primary Examiner* — Ajit Patel
*Assistant Examiner* — Khai M Nguyen
(74) *Attorney, Agent, or Firm* — Maschoff Gilmore & Israelsen

(57) ABSTRACT

An electronic apparatus includes: a first casing; a second casing; a coupling mechanism for coupling the first and second casings while allowing the first and second casings to slide and rotate with each other in a state where the first and second casings being overlapped with each other, the coupling mechanism retaining the first and second casings to be in one of: a first posture in which the first and second casings are being overlapped; a second posture in which the first and second casings are being slidably moved; and a third posture in which the first and second casing are being rotated; a magnet provided in one of the first casing and the second casing; a first magnetic sensor and a second magnetic sensor which are provided in the other of the first casing and the second casing, the sensors outputting detection signals generated by a magnetic force of the magnet.

12 Claims, 11 Drawing Sheets

FIG. 1A
FIG. 1B
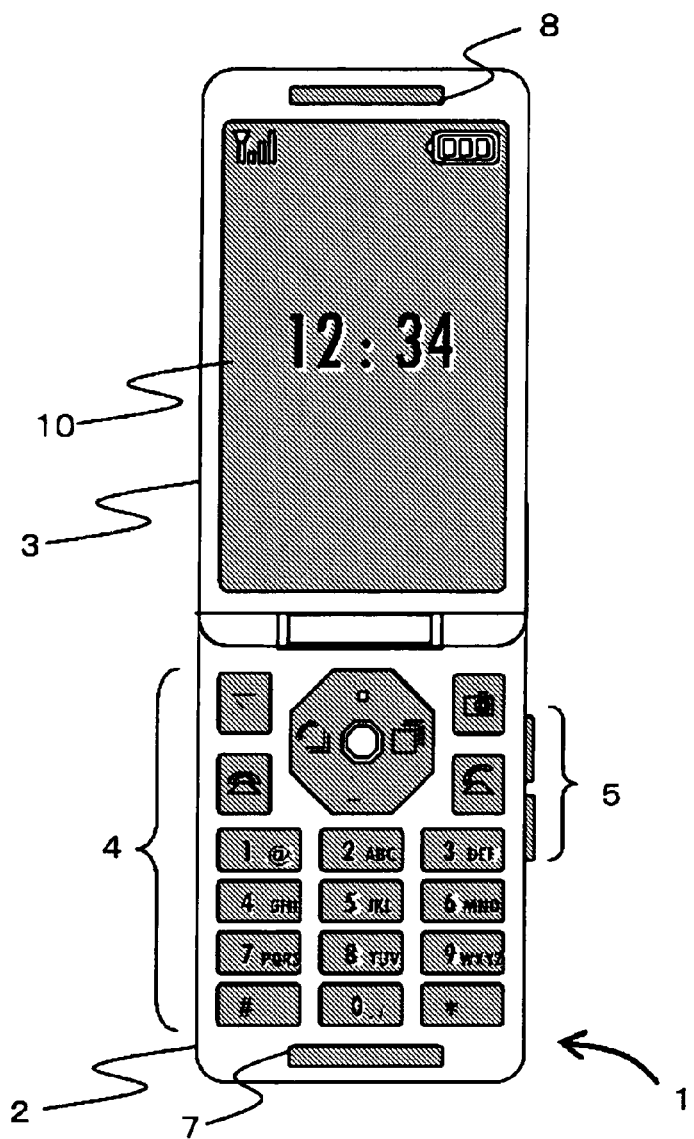
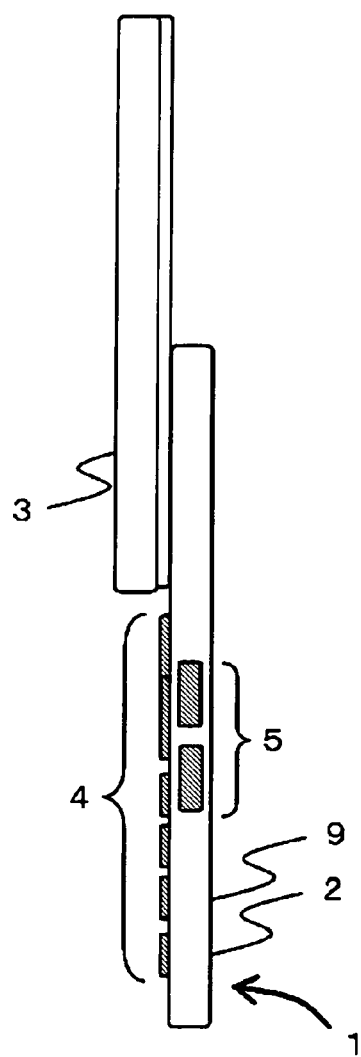

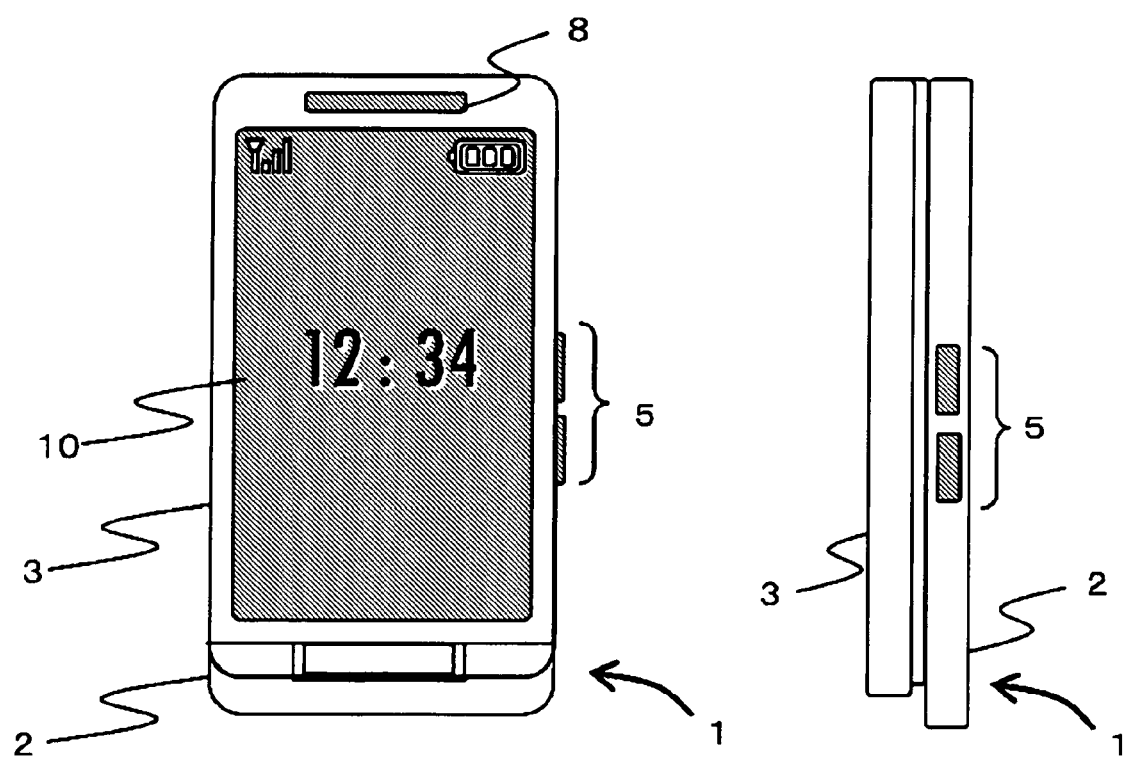

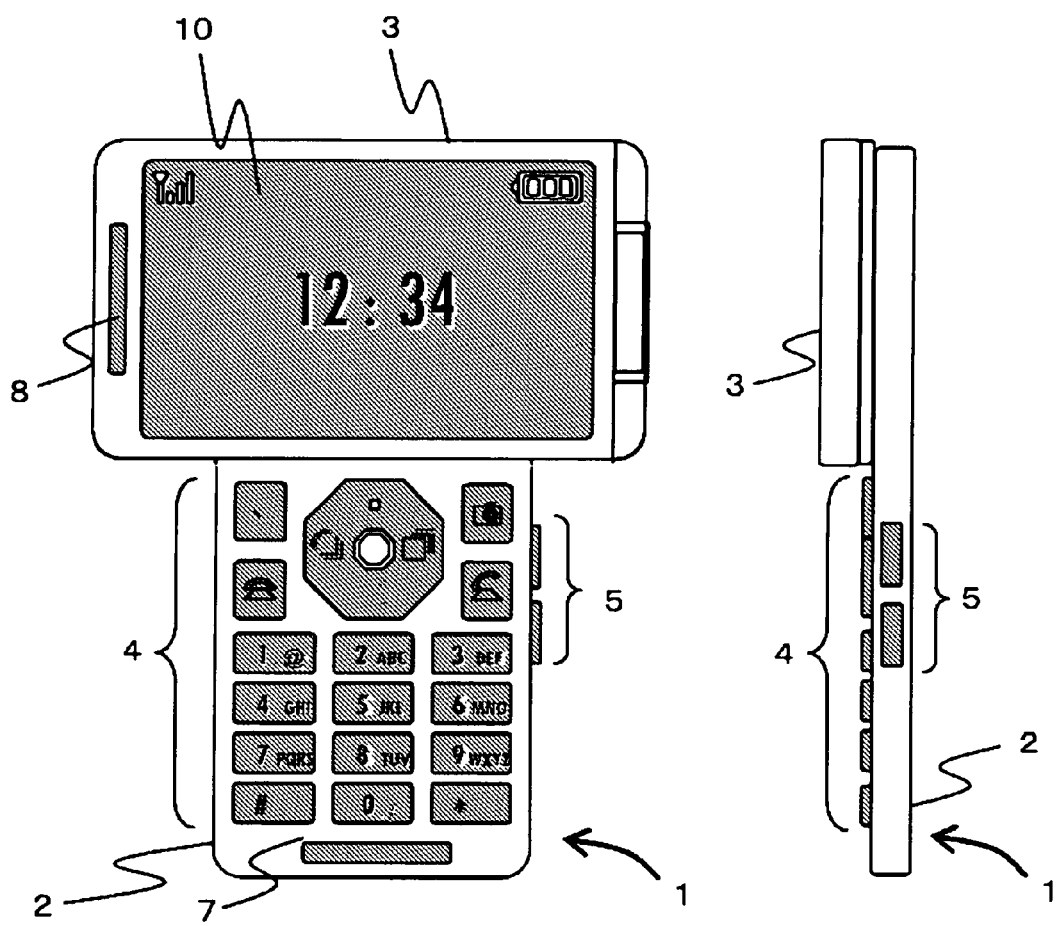

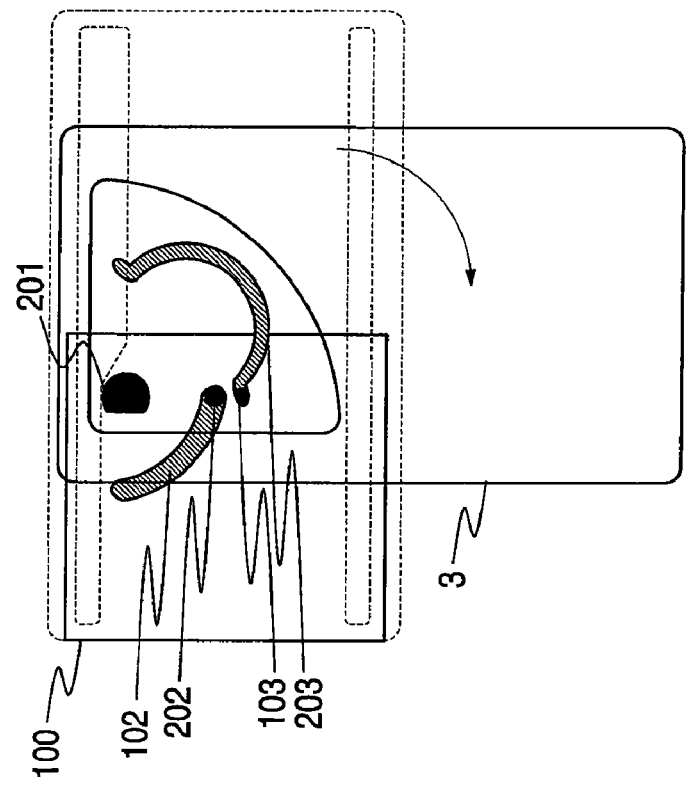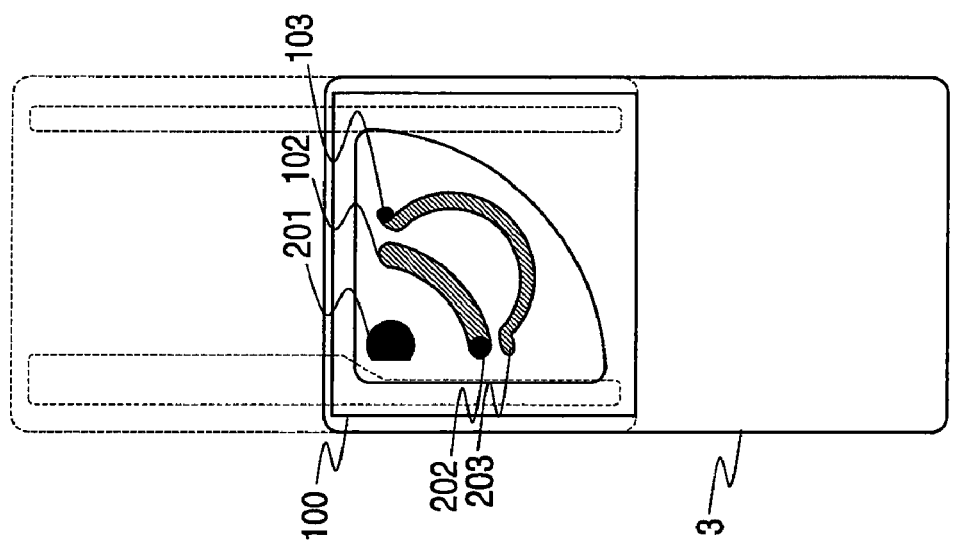

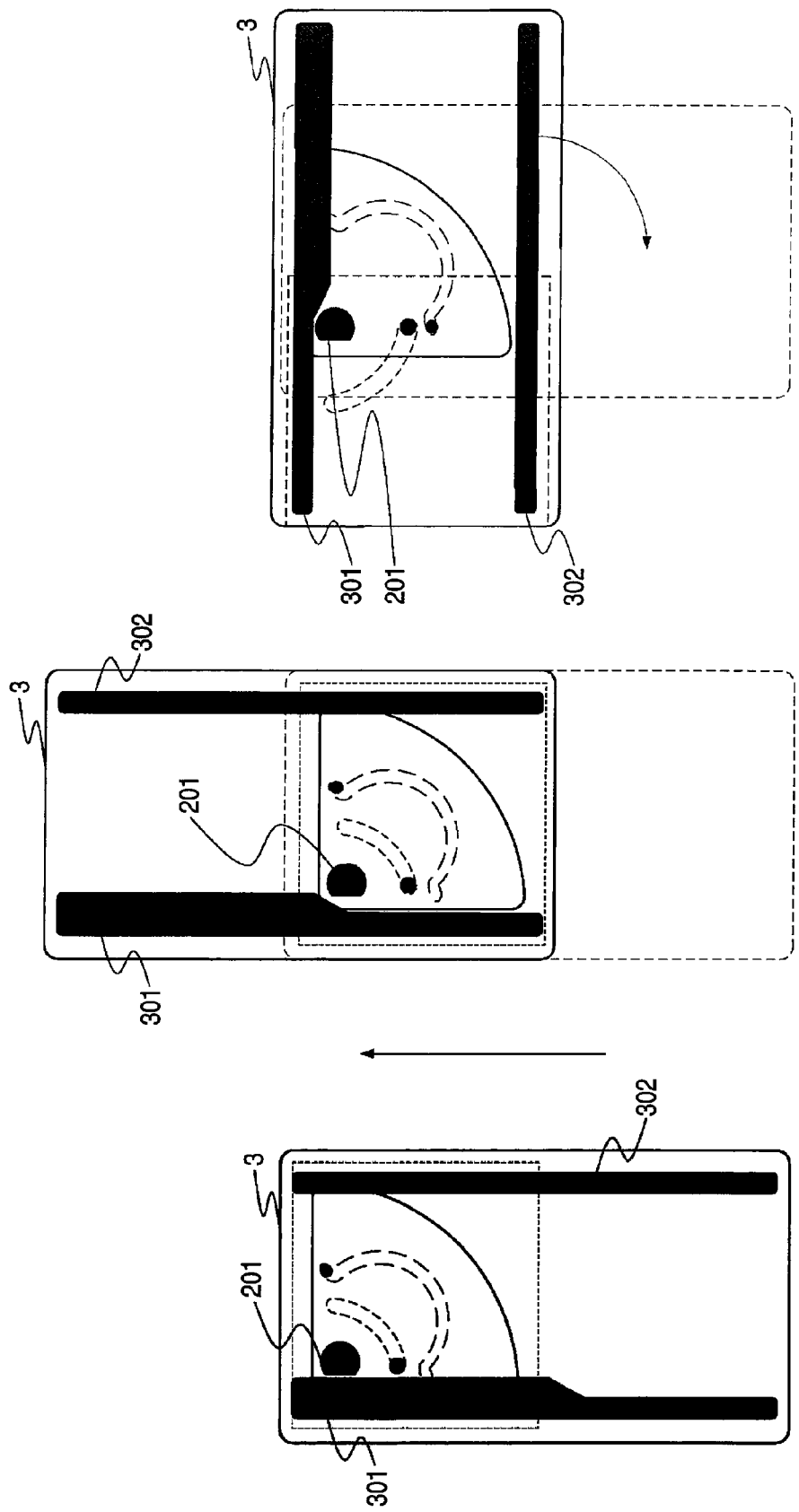

ELECTRONIC APPARATUS

CROSS-REFERENCE TO RELATED APPLICATIONS

The present disclosure relates to the subject matters contained in Japanese Patent Application No. 2009-087998 filed on Mar. 31, 2009, which are incorporated herein by reference in its entirety.

BACKGROUND

1. Field of the Invention

One aspect of the present invention relates to an electronic apparatus including a rotatable or slidable display unit.

2. Description of Related Art

Recently, in accordance with reduction in the size and the weight of an electronic apparatus and improved performance in its signal receiving/transmitting function, the electronic apparatus having a data communication function and a video viewing function have been widely spread. A cellular phone, that is, an example of the electronic apparatus having such functions, is capable of voice communication and data communication by using a radio communication function. Cellular phones having the radio communication function are conveniently used in various fields of telephone communication, receiving/sending e-mails, browsing websites on the Internet and commodities transaction utilizing Internet shopping. In accordance with increase of the applications of such cellular phones and increase of information quantity dealt with by the cellular phones, there is a demand for development of a cellular phone in which information displayed on its screen may be more easily recognized.

Furthermore, cellular phones having a television view function through a one-segment broadcasting service, that is, one type of the video viewing function, have recently been put to practical use. Also in such a cellular phone displaying a television image, there is a demand for a screen that may be more easily viewed.

Incidentally, a related-art cellular phone has a vertical casing so that a user can easily hold it, and is equipped with a display screen in a similar vertical arrangement. In such a cellular phone including a vertical display screen, however, a text is difficult to read in displaying text information because only a small number of characters are displayed in one line. Furthermore, in displaying a video on the screen by using the aforementioned television view function or the like, the displayed image is small because the video delivered in a landscape format is displayed on the vertical screen, and thus, visibility is spoiled.

In order to overcome such a problem, a cellular phone in which a casing having a display screen is rotatable by 90 degrees against a main body of the cellular phone has been put to practical use. When the cellular phone is not used, the casing having the display screen is placed in a vertical state, and in, for example, reading an e-mail or viewing a video, the casing having the display screen is rotated. In this manner, the main body of the cellular phone is in a vertical shape easily held, and at the same time, the cellular phone can be used with the display screen rotated into a landscape shape for easing the view of text information and a video.

Japanese Laid-Open Patent Publication No. JP-A-2008-278226 discloses a cellular phone in which the casing having the display screen is provided along a surface direction, to face front of the cellular phone so that the casing having the display screen may be slidable along the lengthwise direction of the main body of the cellular phone, furthermore, in which a casing having a display screen is rotatable by 90 degrees against a main body of the cellular phone from a state where the casing having the display screen is slid. As alternative related art, Japanese Laid-Open Patent Publication No. JP-A-2008-67335 discloses a cellular phone in which a casing having a display screen is rotatable against a main body of the cellular phone by 90 degrees in the rightward or leftward direction. The casing having the display screen is provided with a magnet, and a magnetic sensor is provided in a position opposing the magnet when the casing having the display screen is rotated. In JP-A-2008-67335, a technique to detect the rotation state of the casing having the display screen by detecting a voltage or a current generated when the magnetic sensor and the magnet come close to each other has been proposed.

In a cellular phone that can be in any of a plurality of states as described in JP-A-2008-278226, when a structure, for example, that a casing having a display screen is slid and further rotated by 90 degrees against a main body of the cellular phone is employed, the cellular phone can be in any of three states, that is, a closed state where the casing having the display screen is not slid, an opened state where the casing is slid and a T-shaped state where the casing is slid and further rotated by 90 degrees. In order to detect such a plurality of states, it is necessary to provide a plurality of magnets and magnetic sensors respectively corresponding to the states within the cellular phone. When a large number of magnets and magnetic sensors are provided within the cellular phone, however, the number of components and lines included therein is disadvantageously increased, so that the downsizing of the cellular phone is prevented.

SUMMARY

According to an aspect of the invention, there is provided an electronic apparatus including: An electronic apparatus comprising: a first casing; a second casing; a coupling mechanism configured to couple the first casing and the second casing while allowing the first casing and the second casing to slide and rotate with respect to each other in a state where the first casing and the second casing being overlapped with each other, the coupling mechanism retaining the first casing and the second casing to be in one of: a first posture in which the first casing and the second casing are being overlapped; a second posture in which the first casing and the second casing are being slidably moved; and a third posture in which the first casing and the second casing are being rotated; a magnet provided in one of the first casing and the second casing; a first magnetic sensor provided in the other of the first casing and the second casing at a position opposing the magnet in the first posture for outputting a first detection signal when a magnetic force is applied by the magnet; and a second magnetic sensor provided in the other of the first casing and the second casing at a position opposing the magnet in the third posture for outputting a second detection signal when the magnetic force is applied by the magnet.

BRIEF DESCRIPTION OF THE DRAWINGS

An exemplary embodiment may be described in detail with reference to the accompanying drawings, in which:

FIGS. 1A and 1B are exemplary diagrams illustrating an exterior structure of a cellular phone, that is, an example of electronic equipment according to an exemplary embodiment of the invention, in an opened state;

FIGS. 2A and 2B are exemplary diagrams illustrating an exterior structure of the cellular phone, according to the exemplary embodiment, in a closed state;

FIGS. 3A and 3B are exemplary diagrams illustrating an exterior structure of the cellular phone, according to the exemplary embodiment, in a T-shaped state;

FIGS. 5A and 5B are exemplary diagrams illustrating a positional relationship between the slide sheet metal and the first casing when the cellular phone, according to the exemplary embodiment, is shifted from the opened state to the T-shaped state;

FIGS. 6A to 6C are exemplary diagrams illustrating a positional relationship between the slide sheet metal and the second casing when the cellular phone, according to the exemplary embodiment, is shifted from the closed state to the opened state and the T-shaped state;

DETAILED DESCRIPTION

Figure 4A:
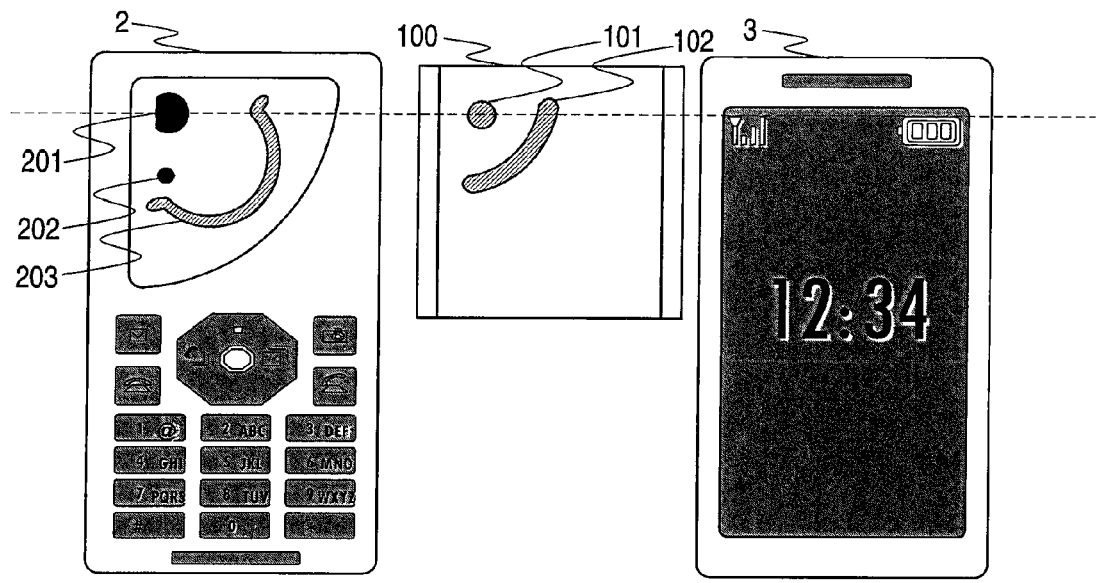
FIGS. 4A to 4C are exemplary front views, exemplary rear views and exemplary side cross-sectional views of a first casing, a second casing and a slide sheet metal of the cellular phone, according to the exemplary embodiment.

An exemplary embodiment of the invention will now be described with reference to FIGS. 1A to 11D.

(Structure of Cellular Phone)

FIGS. 1A and 1B are exemplary diagrams illustrating an exterior structure of a slide-type cellular phone 1, that is, an example of a portable terminal according to the exemplary embodiment. FIG. 1A illustrates the exterior structure taken from a front of the cellular phone 1 placed in an opened state through slide movement, and FIG. 1B illustrates the exterior structure taken from a side of the cellular phone 1 placed in the opened state. Also, FIG. 2A illustrates the exterior structure taken from the front of the cellular phone 1 placed in a closed state through the slide movement, and FIG. 2B illustrates the exterior structure taken from the side of the cellular phone 1 placed in the closed state. As illustrated in FIGS. 1A and 1B, the cellular phone 1 includes a first casing 2 and a second casing 3 overlapping each other and coupled to each other, so that the second casing 3 can be slid to move in a lengthwise direction of the cellular phone 1 on the basis of a slide mechanism described later.

FIGS. 3A and 3B are diagrams illustrating the exterior structure attained when the second casing 3 is rotated by 90 degrees. Specifically, FIG. 3A illustrates the exterior structure taken from the front of the cellular phone 1 placed in a state where the second casing 3 is rotated by 90 degrees (which state is hereinafter designated as a T-shaped state), and FIG. 3B illustrates the exterior structure taken from the side of the cellular phone 1 placed in the T-shaped state. As illustrated in FIGS. 3A and 3B, when the cellular phone 1 is in the opened state, the second casing 3 can be rotated by 90 degrees on the basis of the slide mechanism described later.

The first casing 2 is provided, on its front face, with operation keys 4 including numeric keys of "0" through "9", a calling/answering key, a redial key, a ring-off/power key, a clear key and a first menu key. The first casing 2 is further provided, on its side face, with side keys 5 including a manner mode key and a second menu key. A user inputs various instructions and data to the cellular phone 1 by using the operation keys 4 or the side keys 5. Although the operation keys 4 and the side keys 5 are described to be provided on the first casing 2 in the exemplary embodiment, a part or all of the operation keys 4 and the side keys 5 may be provided on the second casing 3.

The second casing 3 is provided, on its front face, with a main display 10 for displaying, for example, a setting screen for the cellular phone 1, e-mails, websites or videos. Also, an antenna pictogram indicating a level of field intensity received by the cellular phone 1, a battery pictogram indicating a remaining life of a battery 9, or the present time are displayed on the main display 10. It is noted that the main display 10 is, for example, a Liquid Crystal Display (LCD) or an organic Electro Luminescence (EL) display.

The first casing 2 is provided, beneath the operation keys 4, with a microphone 7 for collecting voice of a user in telephone communication. Furthermore, a speaker 8 is provided above the main display 10 on the second casing 3 for outputting voice of a person at the other end in telephone communication. In addition, the first casing 2 is provided, on its back face side, with the battery 9, and when the cellular phone 1 is turned on by pressing and holding down the ring-off/power key, the battery 9 supplies the power to respective circuits included in the cellular phone 1 through a power circuit 34.

The cellular phone 1 includes, in a prescribed position therein, sending/receiving antennas (that is, a data sending/receiving antenna 20 and a TV signal receiving antenna 21 of FIG. 7 described later), so that data signals may be sent/received and TV signals may be received through the antenna 20 and antenna 21.

Furthermore, the first casing 2 or the second casing 3 is provided with a Hall element 11 and a magnet 12 in prescribed positions described later. The Hall element 11 and the magnet 12 are provided so as to keep positional relationships respectively corresponding to the opened state, the closed state and the T-shaped state of the cellular phone 1. In accordance with a voltage generated by the Hall element 11 when the Hall element 11 and the magnet 12 come close to each other, a control unit 31 described later can detect which of the three states the cellular phone 1 is in.

(Internal Structure of Cellular Phone 1)

Figure 7:
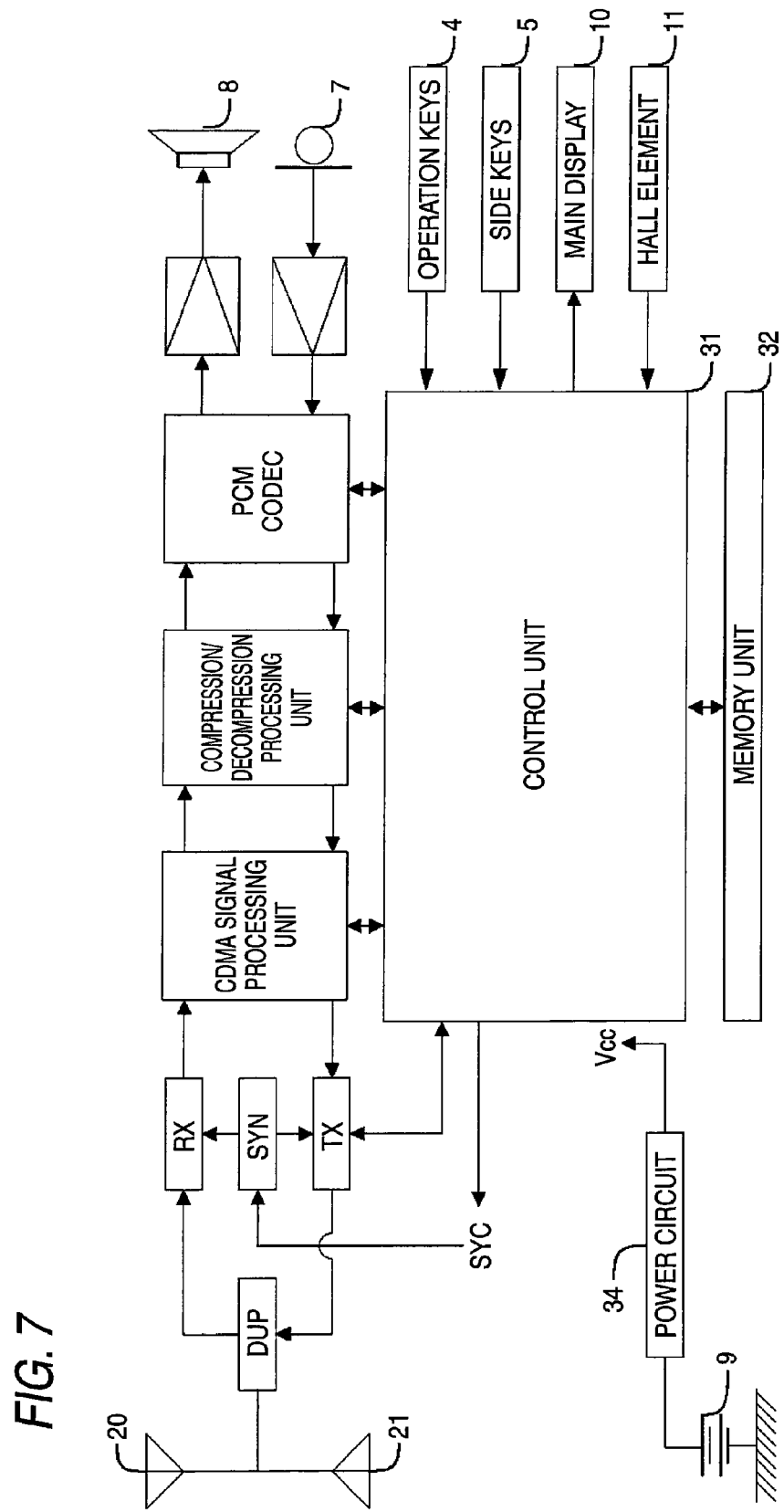
FIG. 7 is an exemplary diagram illustrating an internal structure of the cellular phone, according to the exemplary embodiment.

FIG. 7 is an exemplary block diagram illustrating the internal structure of the cellular phone 1 described herein according to the exemplary embodiment.

The antenna 20 for sending/receiving voice signals and data signals is provided in a prescribed position within the cellular phone 1, so that the cellular phone 1 can send/receive signals to/from a base station through the antenna 20 included therein. As signals sent/received by the cellular phone 1, data signals used for data communication such as e-mails and voice signals used for voice communication with the microphone 7 or the speaker 8 are modulated. Furthermore, the TV antenna 21 for receiving one-segment TV signals is provided in a prescribed position within the cellular phone 1. TV signals received through the TV antenna 21 are processed by the control unit 31 and output to the main display 10 as TV images. Techniques to send/receive data and voice signals through radio communication and to receive TV signals are already known and hence the description is herein omitted.

The control unit 31 is provided within the first casing 2. The control unit 31 includes an electronic circuit such as a Central Processing Unit (CPU). The CPU executes processing in accordance with a program stored in a ROM described below or any of application programs loaded into a RAM described below. Furthermore, the CPU processes signals supplied from the various circuits included in the cellular phone 1 and generates various control signals so as to supply the control signals to the circuits for controlling the cellular phone 1. Through these processing, the CPU collectively controls the cellular phone 1. The control unit 31 further includes a video RAM, so as to store information on images displayed on the main display 10. Moreover, the control unit 31 receives a voltage signal output from the Hall element 11, so as to recognize which state of the closed state, the opened state and the T-shaped state the cellular phone 1 is in, and executes processing in accordance with shifting of the state.

A memory unit 32 stores various application programs executed by the CPU of the control unit 31 and data groups. The memory unit 32 includes a memory device such as a Read Only Memory (ROM) and a Random Access Memory (RAM), or a Hard Disc Drive (HDD).

(Slide Mechanism of Cellular Phone)

Figure 4B:
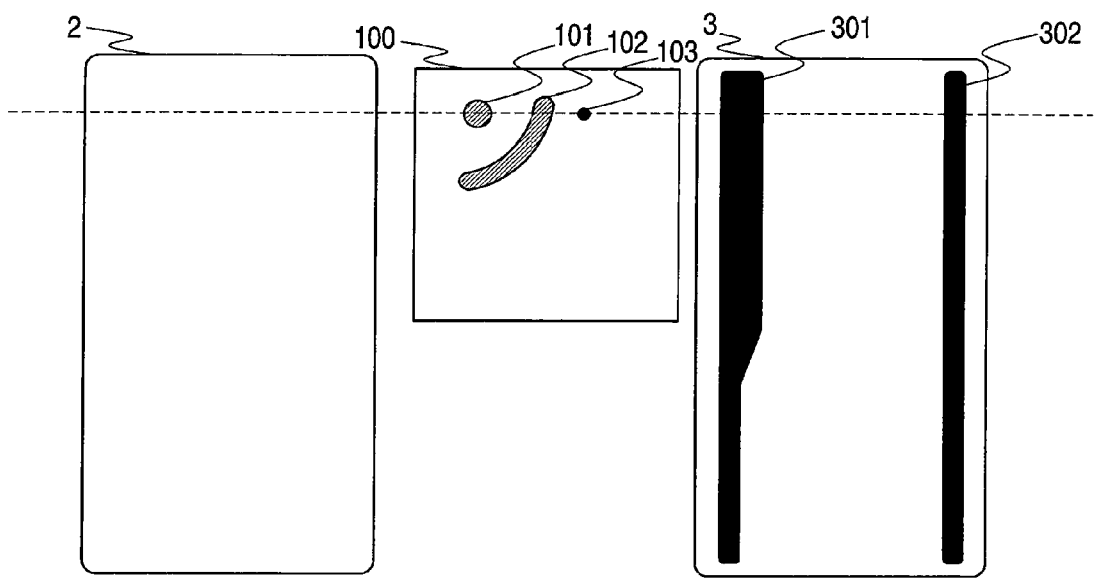
Figure 4C:
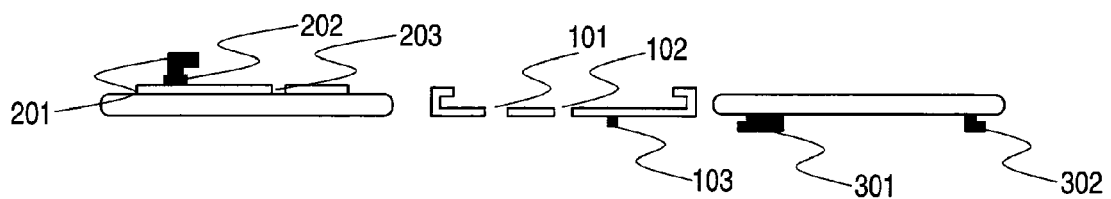

In order to cause the first casing 2 and the second casing 3 to make slide movement and rotation movement, the first casing 2 and the second casing 3 are coupled to each other with a slide sheet metal 100 sandwiched therebetween in the cellular phone 1. FIGS. 4A to 4C illustrate the exemplary structures of the first casing 2, the slide sheet metal 100 and the second casing 3, and specifically, FIG. 4A is a front view of the first casing 2, the slide sheet metal 100 and the second casing 3, FIG. 4B is a rear view of the first casing 2, the slide sheet metal 100 and the second casing 3 and FIG. 4C is a cross-sectional view of the first casing 2, the slide sheet metal 100 and the second casing 3 taken on broken lines of FIGS. 4A and 4B.

The slide sheet metal 100 is processed to have ends each in an enfolded shape, and the enfolded portions protrude beyond its surface. The enfolded portions of the slide sheet metal 100 are engaged with slide projections 301 and 302 provided on the back face of the second casing 3. Thus, the slide sheet metal 100 makes slide movement along the slide projections 301 and 302.

The slide sheet metal 100 is provided with a circular hole 101, into which a rotation projection 201 provided on the first casing 2 is inserted. The rotation projection 201 is formed into a height protruding from the slide sheet metal 100 and a protruding point (a head) of the rotation projection 201 is formed to be larger than the hole 101. The protruding point of the rotation projection 201 is formed into a height that allows a contact with the slide projection 301 along a short axis direction of the second casing 3. The slide sheet metal 100 is coupled to the first casing 2 through the rotation projection 201.

FIGS. 5A and 5B illustrate positional shift of the first casing 2 and the slide sheet metal 100 caused when the cellular phone 1 is shifted from the opened state to the T-shaped state. FIG. 5A illustrates the opened state and FIG. 5B illustrates the T-shaped state. The slide sheet metal 100 is provided with a first projection 103 as illustrated in FIGS. 4B and 4C, and the first projection 103 is inserted into a U-shaped groove 203 provided on the first casing 2. The U-shaped groove 203 has a lock groove (slightly opened outward) at each end thereof. Furthermore, the first casing 2 is provided with a second projection 202 as illustrated in FIGS. 4A and 4C, and the second projection 202 is inserted into an arc groove 102 provided on the slide sheet metal 100. The first and second projections 103 and 202 are respectively moved along the U-shaped groove 203 and the arc groove 102 as illustrated in FIGS. 5A and 5B, so that the second casing 3 moves circumferentially against the slide sheet metal 100.

FIGS. 6A to 6C illustrate positional shift of the slide sheet metal 100 and the second casing 3 caused when the cellular phone 1 is shifted from the closed state to the opened state and further to the T-shaped state. FIG. 6A illustrates the closed state, FIG. 6B illustrates the opened state and FIG. 6C illustrates the T-shaped state. The protruding point of the rotation projection 201 is formed in a shape consisting of a combination of a circular portion and a linear portion as illustrated in FIG. 4A.

As illustrated in FIG. 6A, a linear part of a wide portion of the slide projection 301 is disposed to be movably guided by an outer linear portion of the rotation projection 201. Accordingly, when the second casing 3 is to be rotated when the cellular phone 1 is in the closed state, it cannot be rotated because the outer linear portion of the rotation projection 201 hits the wide portion of the slide projection 301. On the other hand, when the second casing 3 is slid so as to place the cellular phone in the opened state, the second casing 3 is moved to a position where a narrow portion of the slide projection 301 opposes the rotation projection 201 as illustrated in FIG. 6B. Since the narrow portion of the slide projection 301 does not prevent the rotation of the rotation projection 201, the second casing 3 can be rotated in, for example, a clockwise direction when the cellular phone 1 is in the opened state.

In rotating the second casing 3, with the rotation projection 201 used as a fulcrum, the arc groove 102 of the slide sheet metal 100 is slid along the second projection 202 of the first casing 2, and the first projection 103 of the slide sheet metal 100 is slid along the U-shaped groove 203 of the first casing 2.

(State Detection by Hall Element)

The Hall element 11 is a kind of magnetic sensor for generating a voltage in accordance with magnetic flux input thereto by utilizing the Lorentz effect. The Hall element 11 is made of a semiconductor of InSb, GaAs or the like in general and is used under applying a given current thereto. When the magnet 12 is brought close to the Hall element 11, magnetic flux is applied to electrons passing through the Hall element 11. As a result, an electromagnetic force is caused in accordance with a direction of the electrons passing and a direction of the applied magnetic flux, so as to bias the electrons in one direction. Since the bias of the electrons causes an electric field, the control unit 31 detects proximity between the Hall element 11 and the magnet 12 by detecting a voltage taken from the electric field.

Figure 8A:
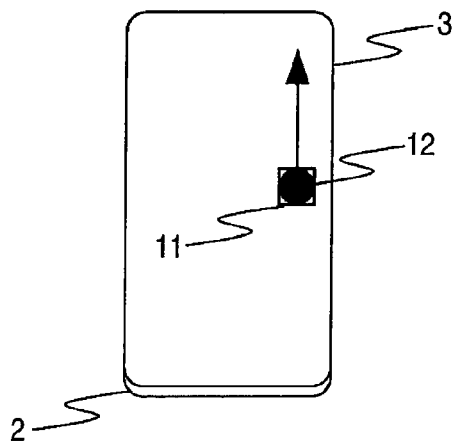
FIGS. 8A to 8D are exemplary diagrams explaining a method for detecting a state by using a magnet and a Hall element according to the exemplary embodiment.
Figure 8B:
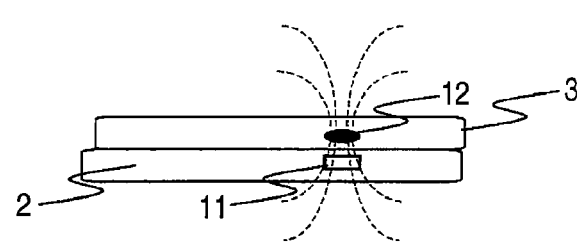
Figure 8C:
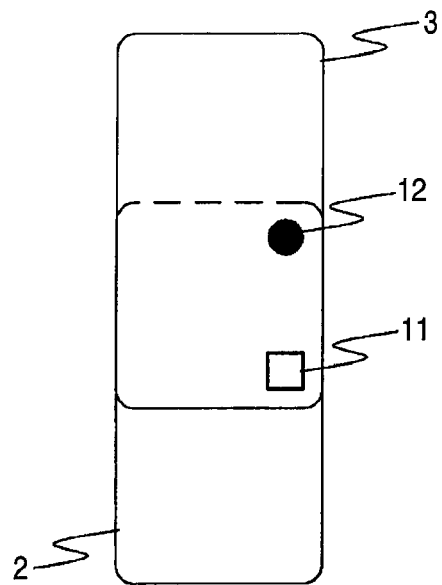
Figure 8D:
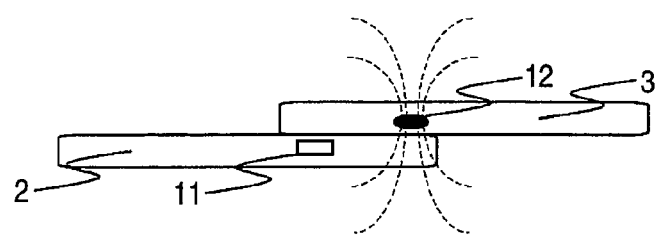

FIGS. 8A to 8D illustrate exemplary diagrams for detecting the shift between the closed state and the opened state of the cellular phone 1 by using the Hall element 11. It is assumed, for example, that the magnet 12 is provided on the first casing 2 of the cellular phone 1 and that the Hall element 11 is provided on the second casing 3. FIG. 8A illustrates a positional relationship between the Hall element 11 and the magnet 12 attained when the cellular phone 1 is in the closed state, and FIG. 8C illustrates a positional relationship therebetween attained when the cellular phone 1 is in the opened state. FIGS. 8B and 8D are exemplary cross-sectional views, taken from a side of the cellular phone 1, of the positional relationships between the Hall element 11 and the magnet 12 respectively corresponding to FIGS. 8A and 8C.

When the cellular phone 1 is in the closed state, the Hall element 11 and the magnet 12 are positioned to overlap each other when seen from above as illustrated in FIG. 8A. In addition, since the Hall element 11 and the magnet 12 are close to each other as illustrated in FIG. 8B, the Hall element 11 generates a voltage in response to the magnetic flux generated by the magnet 12.

On the other hand, when the cellular phone 1 is in the opened state, the Hall element 11 and the magnet 12 are positioned to be away from each other as illustrated in FIGS. 8C and 8D. A density of the magnetic flux applied to the Hall element 11 by the magnet 12 is lower as a distance from the magnet 12 to the Hall element 11 is larger. Therefore, when the cellular phone 1 is in the opened state, the voltage generated by the Hall element 11 is lower than that generated when the cellular phone 1 is in the closed state. The control unit 31 can determine whether the cellular phone 1 is in the closed state or in the opened state based on the positional relationship between the Hall element 11 and the magnet 12 by detecting the voltage output from the Hall element 11.

FIRST EXAMPLE

Figure 9A:
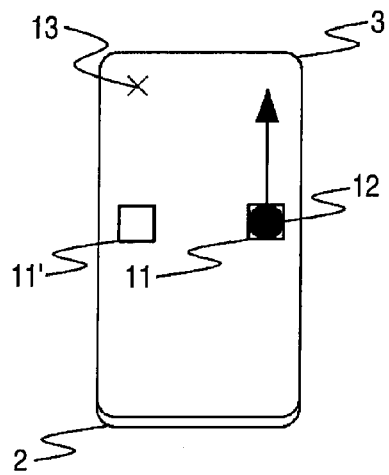
FIGS. 9A to 9D are exemplary diagrams illustrating positions of a magnet and Hall elements in performing a detecting operation for slide movement and rotation movement of a second casing in a cellular phone, according to the exemplary embodiment.
Figure 9B:
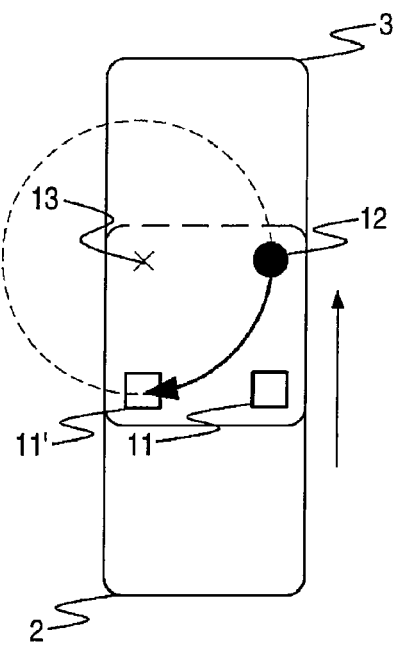
Figure 9C:
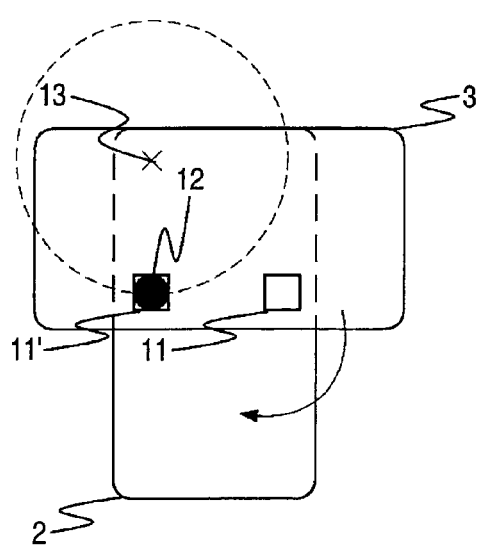
Figure 9D:
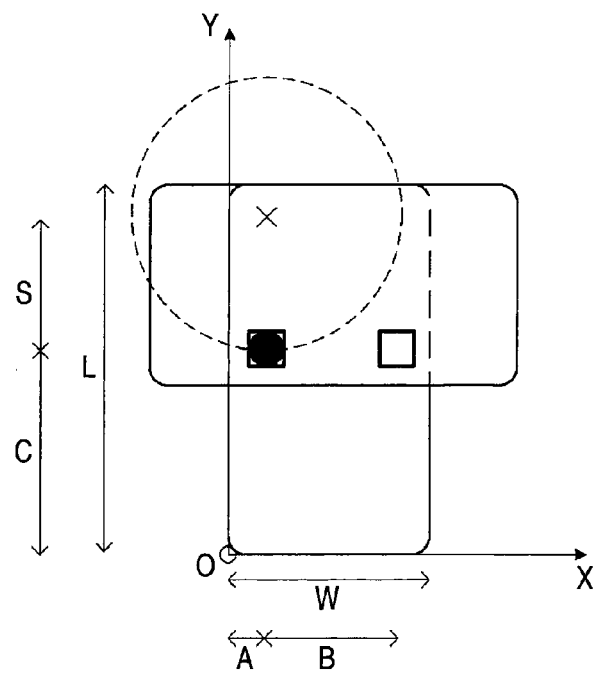

FIGS. 9A to 9D are exemplary diagrams illustrating positional relationships between two Hall elements 11 and 11' and a magnet 12 in shift of a cellular phone 1 from the closed state (shown in FIG. 9A) to the opened state (shown in FIG. 9B) with a second casing 3 slid in the lengthwise direction and further to the T-shaped state (shown in FIG. 9C) with the second casing 3 further rotated by 90 degrees, according to a first example. FIG. 9D illustrates the positional relationships, by using coordinate values, between the two Hall elements 11 and 11' and the magnet 12 attained when the cellular phone 1 is in the T-shaped state. Hereinafter, for simplifying the explanation, the detection of the state of the cellular phone 1 will be described by using coordinates with the widthwise direction of the cellular phone 1 in FIG. 9D regarded as the X axis and the lengthwise direction thereof regarded as the Y axis.

The cellular phone 1 of the first example is provided with the Hall element 11 and the Hall element 11' respectively in a right-leaning position and a left-leaning position on the inner face of the first casing 2 with a width W and a length L. Also, the magnet 12 is provided on the inner face of the second casing 3 with a width W and a length L. When the cellular phone 1 is in the closed state, the Hall element 11 is disposed in a position with coordinate values of (A+B, C), the Hall element 11' is disposed in a position with coordinate values of (A, C) and the magnet 12 is disposed in a position with coordinate values of (A+B, C).

Specifically, when the cellular phone 1 is in the closed state as illustrated in FIG. 9A, the Hall element 11 and the magnet 12 overlap each other in the position with the coordinate values (A+B, C). Since the Hall element 11 and the magnet 12 thus overlap each other, the Hall element 11 generates a voltage. The control unit 31 determines that the cellular phone 1 is in the closed state by detecting the voltage generated by the Hall element 11.

Next, when the second casing 3 is slid upward in the Y axis direction by a distance S in the cellular phone 1 placed in the closed state, the cellular phone 1 is shifted to the opened state as illustrated in FIG. 9B. In this case, the magnet 12 provided on the second casing 3 is also moved in the Y axis direction by the distance S, and the magnet 12 is disposed in a position with coordinate values of (A+B, C+S). On the other hand, since the Hall element 11 and the Hall element 11' provided on the first casing 2 that is not moved are positioned to be away from the magnet 12, a voltage generated by the Hall element 11 and the Hall element 11' is lower than that generated in the closed state. The control unit 31 determines that the cellular phone 1 is in the opened state by detecting this lowered voltage.

Next, when the second casing 3 is rotated in the clockwise direction with a rotation axis 13 (i.e., the rotation projection 201) disposed in a position with coordinate values of (A, C+S) used as a fulcrum in the cellular phone 1 placed in the opened state, the magnet 12 is disposed in a position with coordinate values of (A, C). In other words, the magnet 12 is moved to overlap the Hall element 11' disposed in the position with the coordinate values of (A, C). As a result, the Hall element 11' generates a voltage. The control unit 31 determines that the cellular phone 1 is in the T-shaped state by detecting the voltage generated by the Hall element 11'.

Although the Hall elements 11 and 11' are provided on the first casing 2 and the magnet 12 is provided on the second casing 3 in the first example, the magnet 12 may be provided on the first casing 2 with the Hall elements 11 and 11' provided on the second casing 3 instead. This configuration also applies to other examples described below.

SECOND EXAMPLE

Figure 10A:
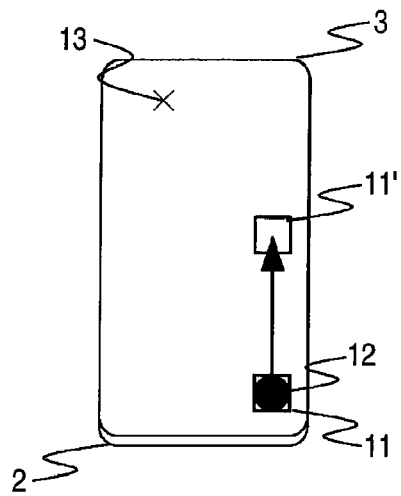
FIGS. 10A to 10D are exemplary diagrams illustrating other positions of a magnet and Hall elements in performing a detecting operation for the slide movement and the rotation movement of a second casing in a cellular phone, according to the exemplary embodiment.
Figure 10B:
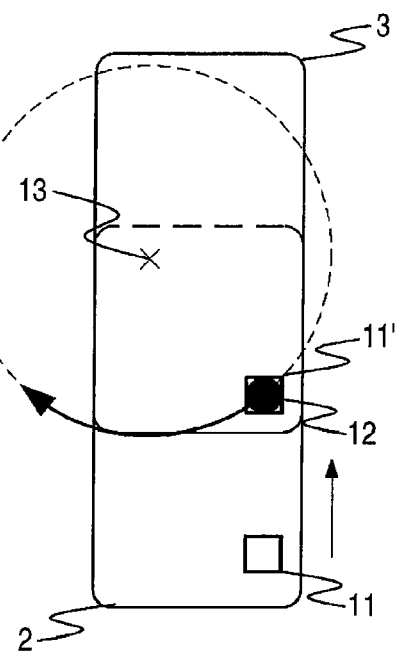
Figure 10C:
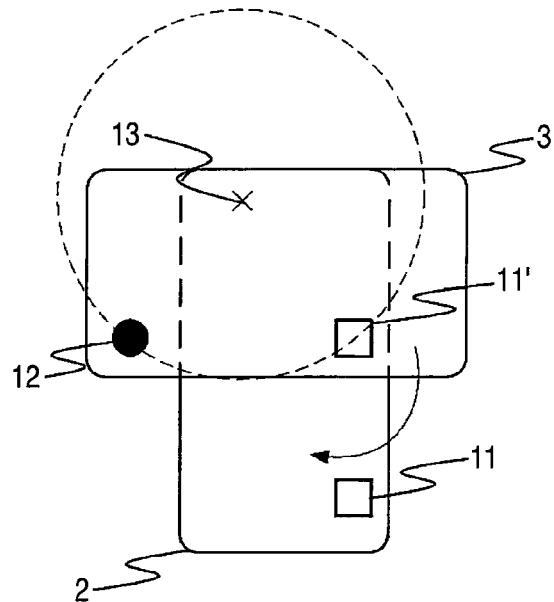
Figure 10D:
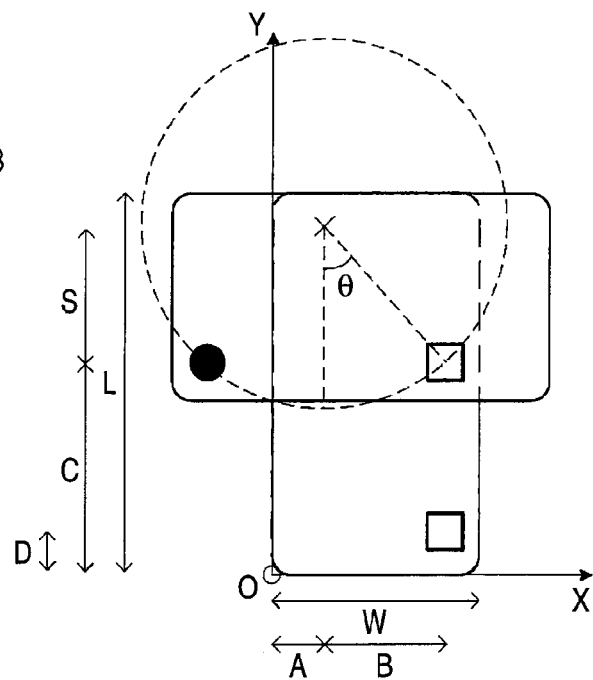

FIGS. 10A to 10D are exemplary diagrams illustrating positional relationships between two Hall elements 11 and 11' and a magnet 12 in shift of the cellular phone 1 from the closed state (shown in FIG. 10A) to the opened state (shown in FIG. 10B) and further to the T-shaped state (shown in FIG. 10C) according to a second example. FIG. 10D illustrates the positional relationships, by using coordinate values, between the two Hall elements 11 and 11' and the magnet 12 when the cellular phone 1 is in the T-shaped state. Differently from the first example, the Hall elements 11 and 11' are disposed to be away from each other in the vertical direction in the second example. Also, when the cellular phone 1 is in the closed state, the magnet 12 is disposed in a position with coordinate values of (A+B, D) in the example. The detection of the state of the cellular phone 1 of the second example will now be described.

When the cellular phone 1 is placed in the closed state as illustrated in FIG. 10A, the Hall element 11 and the magnet 12 overlap each other in the position with the coordinate values (A+B, D). Since the Hall element 11 and the magnet 12 thus overlap each other, the Hall element 11 generates a voltage. The control unit 31 determines that the cellular phone 1 is in the closed state by detecting the voltage generated by the Hall element 11.

Next, when the second casing 3 is slid upward in the Y axis direction by a distance S in the cellular phone 1 placed in the closed state, the cellular phone 1 is shifted to the opened state as illustrated in FIG. 10B. In this case, the magnet 12 provided on the second casing 3 is also moved in the Y axis direction by the distance S, and the magnet 12 is disposed in a position with coordinate values of (A+B, C). Specifically, the magnet 12 is moved to overlap the Hall element 11' disposed in the position with the coordinate values of (A+B, C).

As a result, the Hall element 11' generates a voltage. The control unit 31 determines that the cellular phone 1 is in the opened state by detecting the voltage generated by the Hall element 11'.

Next, when the second casing 3 is rotated in the clockwise direction with a rotation axis 13 (i.e., the rotation projection 201) disposed in a position with coordinate values of (A, C+S) used as a fulcrum in the cellular phone 1 placed in the opened state, the cellular phone 1 is shifted to the T-shaped state as illustrated in FIG. 10C. As a result, the magnet 12 provided on the second casing 3 is rotated in the clockwise direction with the rotation axis 13 used as a fulcrum. At this point, assuming that an angle between the magnet 12 and the Y axis is $\theta$, the magnet 12 is rotated to a position with coordinate values of $(A-\sin(90-\theta), C+S-\cos(90-\theta))$. In other words, the magnet 12 is moved to be away from the Hall element 11 and the Hall element 11', and therefore, the Hall elements 11 and 11' generate a voltage with a small value.

Accordingly, the control unit 31 determines that the cellular phone 1 is in the T-shaped state by detecting that the voltage generated by the Hall elements 11 and 11' has a small value.

THIRD EXAMPLE

Figure 11A:
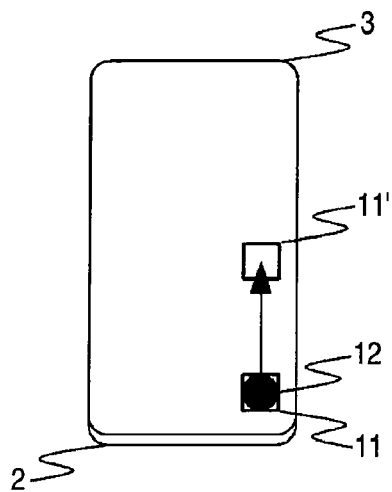
FIGS. 11A to 11D are exemplary diagrams illustrating further other positions of a magnet and Hall elements in performing a detection operation for first slide movement and second slide movement of a second casing in a cellular phone, according to the exemplary embodiment.
Figure 11B:
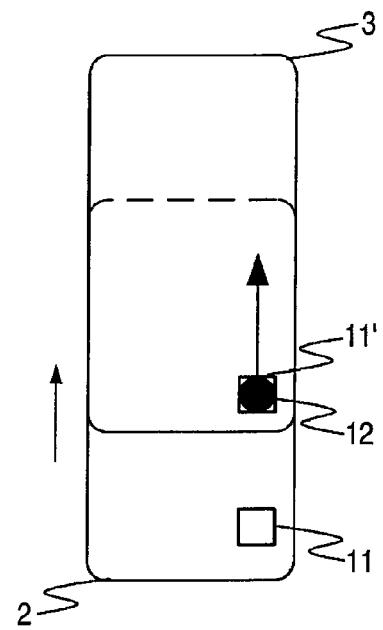
Figure 11C:
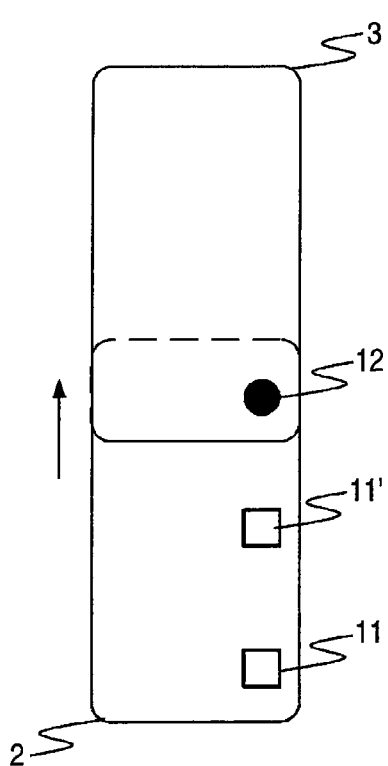
Figure 11D:
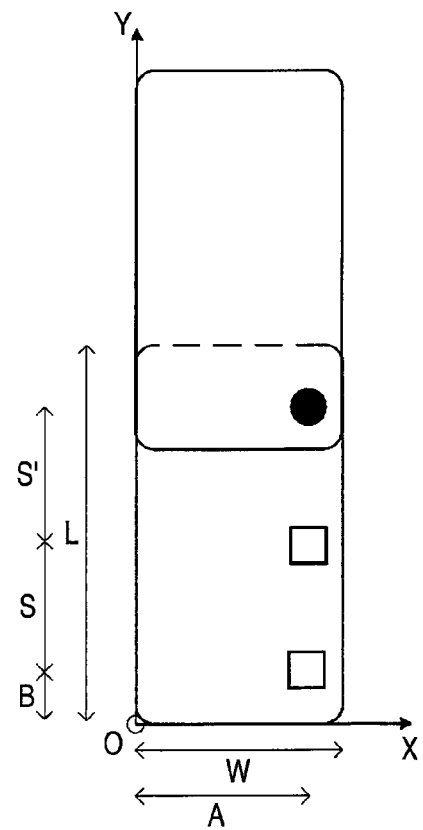

FIGS. 11A to 11D are exemplary diagrams illustrating positional relationships between two Hall elements 11 and 11' and a magnet 12 in shift of a cellular phone 1 from the closed state (shown in FIG. 11A) to a first opened state (shown in FIG. 11B) caused by sliding the second casing 3 to a first position in the lengthwise direction and further to a second opened state (shown in FIG. 11C) caused by sliding the second casing 3 to a second position in the lengthwise direction, according to a third example. FIG. 11D illustrates the positional relationships, by using coordinate values, between the Hall elements 11 and 11' and the magnet 12 when the cellular phone 1 is in the second opened state.

In the third example, the cellular phone 1 is provided with the Hall element 11 and the Hall element 11' in positions away from each other in the vertical direction on the first casing 2 with a width W and a length L. Also, the magnet 12 is provided in a position illustrated in FIG. 11D on the second casing 3 with a width W and a length L. When the cellular phone 1 is in the closed state, the Hall element 11 is disposed in a position with coordinate values of (A, B), the Hall element 11' is disposed in a position with coordinate values of (A, B+S) and the magnet 12 is disposed in a position with coordinate values of (A, B).

First, when the cellular phone 1 is placed in the closed state as illustrated in FIG. 11A, the Hall element 11 and the magnet 12 overlap each other in the position with the coordinate values (A, B). Since the Hall element 11 and the magnet 12 thus overlap each other, the Hall element 11 generates a voltage. The control unit 31 determines that the cellular phone 1 is in the closed state by detecting the voltage generated by the Hall element 11.

Next, when the second casing 3 is slid in the Y axis direction by a distance S in the cellular phone 1 placed in the closed state, the cellular phone 1 is shifted to the first opened state as illustrated in FIG. 11B. In this case, the magnet 12 provided on the second casing 3 is also moved in the Y axis direction by the distance S, and the magnet 12 is disposed in a position with coordinate values of (A, B+S). Specifically, the magnet 12 is moved to overlap the Hall element 11' disposed in the position with the coordinate values of (A, B+S). As a result, a voltage is generated by the Hall element 11'. The control unit 31 determines that the cellular phone 1 is in the first opened state by detecting the voltage generated by the Hall element 11'.

Next, when the second casing 3 is further slid in the Y axis direction by a distance S' in the cellular phone 1 placed in the first opened state, the cellular phone 1 is shifted to the second opened state as illustrated in FIG. 11C. In this case, the magnet 12 provided on the second casing 3 is also moved in the Y axis direction by the distance S', and the magnet 12 is disposed in a position with coordinate values of (A, B+S+S'). Specifically, the magnet 12 is moved to be away from the Hall element 11 and the Hall element 11'. As a result, a voltage generated by the Hall elements 11 and 11' has a small value. Accordingly, the control unit 31 determines that the cellular phone 1 is in the second opened state by detecting that the voltage generated by the Hall elements 11 and 11' has a small value.

Although the second casing 3 is slid in the lengthwise direction in the third example, the second casing 3 may be slid in the widthwise direction or another direction, and alternatively, the slide direction may be different between the shift to the first opened state and the shift to the second opened state. Incidentally, the cellular phone is shifted from the closed state to the opened state through the slide movement and further to the T-shaped state through the rotation movement in the above-described examples. Instead, the cellular phone may be shifted from the closed state to the opened state through slide movement using a similar hinge structure, and shifted from the closed state to the T-shaped state through rotation movement.

According to the operation described in each of the examples, in the cellular phone in which the second casing 3 makes the slide movement and the rotation movement, the magnet 12 is provided on the second casing 3 and the Hall element 11 and the Hall element 11' are provided on the first casing 2. The magnet 12 and the Hall elements 11 and 11' are disposed in positions in accordance with the movement of the second casing 3. The control unit 31 determines which of the three applicable states the second casing 3 is in by detecting a voltage generated by the Hall element 11 and the Hall element 11' in accordance with distances from the magnet 12. In general, in electronic apparatus in which a second casing 3 makes movement, a pair of a magnet 12 and a Hall element 11 are required with respect to each movement pattern. According to the exemplary embodiment of the invention, however, the three states of the second casing 3 may be detected by using one magnet 12 and two Hall elements 11 and 11'. Accordingly, the number of components and lines included in the cellular phone 1 may be reduced. Although the cellular phone that can be placed in any of the three states is described as an example in the exemplary embodiment, the invention is not limited to such a cellular phone but is applicable to a cellular phone that can be placed in any of four or more states. Furthermore, although the movements of the casing for shifting the state of the cellular phone are exemplarily described as the slide movement and the rotation movement in the exemplary embodiment, the casing may be moved through another movement such as folding rotation.

Incidentally, in the exemplary embodiment, a Hall element is described as an example of the magnetic sensor. The invention is not limited to the Hall element but the magnetic sensor may be a magneto-resistance effect element or a magnetic impedance element. Furthermore, in the exemplary embodiment, a cellular phone is described as an example of the electronic apparatus. The invention is not limited to the cellular phone but is applicable to, for example, a Personal Digital Assistant (PDA), a wired terminal, a compact information processor and the like. In short, the present invention is not limited to the aforementioned exemplary embodiment but may be embodied with components modified without departing from the spirit of the invention. Furthermore, the plural components described in the aforementioned exemplary embodiment may be appropriately combined for practicing the invention. For example, some of components out of all the components described in the exemplary embodiment may be omitted.

What is claimed is:

1. An electronic apparatus comprising:
   a first casing;
   a second casing;
   a coupling mechanism configured to couple the first casing and the second casing while allowing the first casing and the second casing to slide and rotate with respect to each other in a state where the first casing and the second casing being overlapped with each other, the coupling mechanism retaining the first casing and the second casing to be in one of: a first posture in which the first casing and the second casing are being overlapped; a second posture in which the first casing and the second casing are being slidably moved; and a third posture in which the first casing and the second casing are being rotated;

a magnet provided in one of the first casing and the second casing;

a first magnetic sensor provided in the other of the first casing and the second casing at a position opposing the magnet in the first posture for outputting a first detection signal when a magnetic force is applied by the magnet; and a second magnetic sensor provided in the other of the first casing and the second casing at a position opposing the magnet in the third posture for outputting a second detection signal when the magnetic force is applied by the magnet.

2. The electronic apparatus of claim 1,
wherein the first magnetic sensor is disposed on a first axis parallel to a first movement axis of the magnet in a slide movement made for shifting to the second posture, and
wherein the second magnetic sensor is disposed on a second axis parallel to a second movement axis of the magnet in a rotation movement made for shifting to the third posture.

3. The electronic apparatus of claim 2, further comprising:
a controller configured to detect which one of the first posture, the second posture and the third posture the first casing and second casing are retained in based on the first magnetism detection signal and the second detection signal.

4. The electronic apparatus of claim 1, further comprising:
a controller configured to detect which one of the first posture, the second posture and the third posture the first casing and second casing are retained in based on the first magnetism detection signal and the second detection signal.

5. An electronic apparatus comprising:
a first casing;
a second casing; and
a coupling mechanism configured to couple the first casing and the second casing while allowing the first casing and the second casing to slide and rotate with respect to each other in a state where the first casing and the second casing being overlapped with each other, the coupling mechanism retaining the first casing and the second casing to be in one of: a first posture in which the first casing and the second casing are being overlapped; a second posture in which the first casing and the second casing are being slidably moved; and a third posture in which the first casing and the second casing are being rotated;

a magnet provided in one of the first casing and the second casing;

a first magnetic sensor provided in the other of the first casing and the second casing at a position opposing the magnet in the first posture for outputting a first detection signal when a magnetic force is applied by the magnet; and a second magnetic sensor provided in the other of the first casing and the second casing at a position opposing the magnet in the second posture for outputting a second detection signal when the magnetic force is applied by the magnet.

6. The electronic apparatus of claim 5,
wherein the first magnetic sensor and the second magnetic sensor are disposed on an axis parallel to a movement axis of the magnet in a slide movement made for shifting to the second posture.

7. The electronic apparatus of claim 6, further comprising:
a controller configured to detect which one of the first posture, the second posture and the third posture the first casing and second casing are retained in based on the first magnetism detection signal and the second detection signal.

8. The electronic apparatus of claim 5, further comprising:
a controller configured to detect which one of the first posture, the second posture and the third posture the first casing and second casing are retained in based on the first magnetism detection signal and the second detection signal.

9. An electronic apparatus comprising:
a first casing;
a second casing; and
a coupling mechanism configured to couple the first casing and the second casing while allowing the first casing and the second casing to slide and rotate with respect to each other in a state where the first casing and the second casing being overlapped with each other, the coupling mechanism retaining the first casing and the second casing to be in one of: a first posture in which the first casing and the second casing are being overlapped; a second posture in which the first casing and the second casing are being slidably moved to a first position; and a third posture in which the first casing and the second casing are being slidably moved to a second position;

a magnet provided in one of the first casing and the second casing;

a first magnetic sensor provided in the other of the first casing and the second casing at a position opposing the magnet in the first posture for outputting a first detection signal when a magnetic force is applied by the magnet; and a second magnetic sensor provided in the other of the first casing and the second casing at a position opposing the magnet in the second posture for outputting a second detection signal when the magnetic force is applied by the magnet.

10. The electronic apparatus of claim 9,
wherein the first magnetic sensor and the second magnetic sensor are disposed on an axis parallel to a movement axis of the magnet in a slide movement made for shifting to the second posture.

11. The electronic apparatus of claim 10, further comprising:
a controller configured to detect which one of the first posture, the second posture and the third posture the first casing and second casing are retained in based on the first magnetism detection signal and the second detection signal.

12. The electronic apparatus of claim 9, further comprising:
a controller configured to detect which one of the first posture, the second posture and the third posture the first casing and second casing are retained in based on the first magnetism detection signal and the second detection signal.

* * * * *